3,306,886
POLYMERIZATION OF N-VINYL LACTAMS USING PLURAL STAGE HEATING IN THE PRESENCE OF CATALYST COMPOSITIONS OF HYDRIDES OR BOROHYDRIDES OF ALKALI METALS AND WATER
Frederick Grosser, Midland Park, and Eugene V. Hort and Arthur Schwartz, Metuchen, N.J., assignors to General Aniline & Film Corporation, New York, N.Y., a corporation of Delaware
No Drawing. Filed Oct. 23, 1963, Ser. No. 318,195
12 Claims. (Cl. 260—88.3)

The present invention relates, in general, to the polymerization of N-vinyl lactams and, in particular, to improved methods of polymerizing N-vinyl lactams to produce insoluble polymers thereof.

Polymerized N-vinyl lactams and particularly polyvinyl pyrrolidone of the type that are soluble in water and many common organic solvents are well known and widely used in industry as stripping agents in processes for the dyeing of textiles; dispersants in suspension polymerizations; thickening agents for pharmaceuticals, veterinarian and cosmetic preparations; constituents of adhesive and sizing compositions; binders for special lithographic and printing processes and as a modifier or replacement for gum arabic; gelatin or polyvinyl alcohol. In addition, perhaps the most widely known and most successful use of a polyvinyl lactam has been the use of polyvinyl pyrrolidone as a blood plasma colloid for intravenous use and shock therapy.

Only recently has it been discovered that insoluble polymers of an N-vinyl lactam, such as N-vinyl pyrrolidone, could be obtained by heating, for example, N-vinyl pyrrolidone at an elevated temperature in the presence of a small amount of a catalyst consisting essentially of a compound selected from the group consisting of alkaline metals and alkaline earth metals and their corresponding oxides, hydroxides and alkoxides. The polymerization reaction was initiated by subjecting the reaction charge to high temperatures until the polymerization reaction started. The induction times experienced by this procedure were quite long and the reaction periods varied from about four hours to as much as twenty-four hours. Sometimes as a result of maintaining the reaction charge at such high temperatures for such relatively long periods, thermal runaways of the reaction were induced. It was also noted that the presence of impurities in the starting material affected the polymerization reaction as well as the purity, color and yield of the final product. Thus, special precautions were taken to remove impurities from the ingredients as well as drying them and the reaction vessel to eliminate water.

Accordingly, it is an object of this invention to provide methods of producing insoluble polymers of N-vinyl lactams.

Another object of this invention resides in provision of catalytic methods of polymerizing N-vinyl lactams to produce insoluble polymers thereof.

Yet another object of this invention resides in the provision of improved catalytic methods of producing insoluble polymers of N-vinyl lactams wherein the purity of the starting material did not inhibit the polymerization reaction.

Still another object of this invention resides in the provision of novel catalytic methods for the polymerization of N-vinyl lactams wherein the induction period is controlled and/or shortened; permits the use of lower reaction temperatures; increases substantially the yield and quality of the polymer so produced.

Further objects and advantages of the invention will become further apparent from the following detailed description thereof.

It has now been discovered that significant increases in yields of polyvinyl lactams are obtained by methods which comprise heating a mixture comprising an N-vinyl lactam, a polymerization catalyst, hereinafter more fully described, and water at a first elevated temperature for a period of time sufficient to induce incipient polymerization and forthwith cooling said mixture to a second temperature lower than said first temperature and maintaining said mixture at said second temperature until polymerization is complete.

The amounts of water which have been found useful in achieving the objects of the invention can vary from as little as 1.0 weight percent and lower to as much as 70 weight percent based on the weight of the N-vinyl lactam charged to the reaction vessel. Beneficial results are obtained by employing amounts of water in the range of from 5 weight percent to about 40 weight percent based on the N-vinyl lactam and is, therefore, preferred. The water employed should preferably be free of ions which will affect or interfere with the polymerization reaction. Thus, distilled water is preferred although water free of substantial amounts of impurities can be employed, if desired.

The N-vinyl lactams which are amenable to the methods of the invention can be conveniently characterized by the formula:

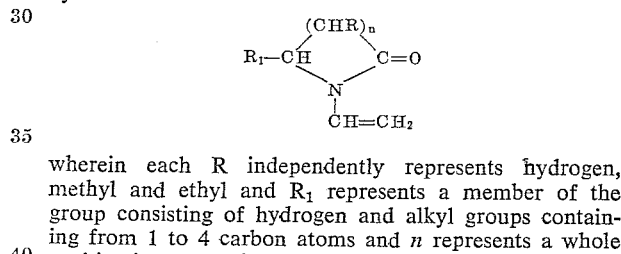

wherein each R independently represents hydrogen, methyl and ethyl and $R_1$ represents a member of the group consisting of hydrogen and alkyl groups containing from 1 to 4 carbon atoms and $n$ represents a whole positive integer of from 2 through 4.

Typical N-vinyl lactams include N-vinyl pyrrolidinone itself, N-vinyl piperidone, N-vinyl caprolactam, N-vinyl-3-methyl pyrrolidinone or piperidone, or caprolactam, N-vinyl-4-methyl pyrrolidinone, or piperidone or caprolactam, N-vinyl-5-methyl pyrrolidinone or piperidone, N-vinyl-3-ethyl pyrrolidinone, N-vinyl-4,5-dimethyl pyrrolidinone, N-vinyl-5,5-dimethyl pyrrolidinone, N-vinyl-3,3,5-trimethyl pyrrolidinone, N-vinyl-5-methyl-5-ethyl pyrrolidinone, N-vinyl 3,4,5-trimethyl-3-ethyl pyrrolidinone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl caprolactam, N-vinyl-7-ethyl caprolactam, N-vinyl-3,5-dimethyl caprolactam, N-vinyl-4,6-dimethyl caprolactam, N-vinyl-3,5,7-trimethyl caprolactam.

The classes of catalysts which have been found effective in promoting the polymerization of N-vinyl pyrrolidone include the hydrides and borohydrides of the alkali metals. Representative alkali metal hydrides and borohydrides which have been tested and found effective include sodium borohydride, potassium borohydride and sodium hydride. Other alkali metal hydrides and borohydrides which can also be employed include lithium hydride, lithium borohydride, cesium hydride, cesium borohydride, rubidium hydride and rubidium borohydride. If desired, mixtures of alkali metal hydrides and/or alkali metal borohydrides can be employed as catalysts for the polymerization.

In one aspect of this invention the provision for the use of alkali metal hydrides and/or borohydrides in combination with alkali and alkaline earth metals and their corresponding oxides, hydroxides and alkoxides is included since it has been found that such mixtures are entirely suitable for polymerizing N-vinyl pyrrolidone to an insoluble polymer. Indeed, in certain instances it appears that a synergistic effect is obtained which is better than either of the catalysts alone.

The amount of catalyst necessary to effect polymerization of the N-vinyl lactam is not necessarily a critical feature of the invention and can be varied over a wide range of from about .05 weight percent to 10.0 weight percent, based on monomer, although amounts above and below this range can be employed if desired. An amount of catalyst of about 1.0 weight percent provides an optimum of reaction rates and reaction times and is therefore preferred.

The first elevated temperature employed in carrying out the methods of the invention can be any elevated temperature and preferably a temperature in the range of from about 125° C. to 200° C.

The time at which the reaction mixture is held at the first elevated temperature to induce incipient polymerization can be varied considerably depending on the temperature employed. In general, however, the period of time will vary from about one hour or less to about three hours.

The second temperature at which the reaction mixture is maintained until polymerization is complete can be any temperature below the first elevated temperature and generally, for the sake of convenience, is maintained in the range of from 75° C. to 100° C. Polymerization of a mixture is usually complete within a short time when maintained at a temperature in the above range.

In carrying out the methods of the invention, an N-vinyl lactam, such as N-vinyl pyrrolidone, is charged to an autoclave equipped with a stirrer, reflex condenser and thermometer. The reactants, lactam, catalyst and water are charged simultaneously or, if desired, can be added separately to the autoclave. The contents of the autoclave are preferably purged with nitrogen gas or any other inert gas and the pressure on the reaction medium reduced and heat applied. The reaction mixture is maintained at the first elevated temperature for a period of time sufficient to induce incipient polymerization after which it is allowed to cool to a second temperature lower than the first temperature where it is maintained until a slight temperature rise is noted. Usually this slight temperature rise will occur within several minutes after reaching the second elevated temperature. This second elevated temperature is maintained for an additional period of time, if desired, until polymerization is complete. Subsequently water is added to the reaction mixture and the mixture heated in order to extract any water solubles from the polymer after which it is discharged, filtered and dried.

As used herein the term "insoluble polyvinyl lactams" and particularly "insoluble polyvinyl pyrrolidone" is intended to define the product which is insoluble in water, strong mineral acids, caustic solutions and common organic solvents and to distinguish it from the soluble polymeric materials based on N-vinyl pyrrolidone known in the art as represented by U.S. 8,265,450 and U.S. 2,335,454.

The following examples will serve to further illustrate the practice of the invention with greater particularity although it is to be understood that the invention is not limited thereto.

EXAMPLE 1

To a one-gallon autoclave were charged 360 grams of N-vinyl pyrrolidone, 3.6 grams of sodium borohydride flakes and 52 milliliters of distilled water. The charge was heated and maintained at 140° C. for one hour, after which it was allowed to cool to 100° C., then maintained at that temperature. A rise of 6° C. was noted three minutes after reaching 100° C. The mixture was held at 100° C. for one hour, cooled to 80° C., after which 1500 milliliters of water were added. The mixture was then heated and maintained at 100° C. for one hour in order to extract any water solubles. The mixture was discharged as a white paste that filtered easily. There was provided insoluble polyvinyl pyrrolidone in a yield of 97% of theory.

EXAMPLE 2

To an autoclave were charged 360 grams of N-vinyl pyrrolidone, 15 grams of sodium borohydride flakes and 110 milliliters of distilled water. The mixture was heated and maintained at 130° C. for two hours, after which it was allowed to cool. At 75° C. the temperature rose 7° C. There was provided insoluble polyvinyl pyrrolidone in a yield of 97% of theory.

EXAMPLE 3

To a small citrate type glass pressure flask were charged 36 grams of N-vinyl pyrrolidone, 0.72 gram of sodium borohydride flakes and 3.5 milliliters of water. A magnetic agitator was inserted, the flask was purged with nitrogen and sealed. The flask was heated in an oil bath while the contents were stirred magnetically. A temperature of 135° C. was maintained for two and a quarter hours after which the oil bath was allowed to cool. When the temperature of the oil bath reached 85° C., there was a rise of 4° C. At the same time, the agitator was stopped due to the solidification of the mixture. Within thirty seconds the mixture was completely polymerized, and the flask was packed tightly with polymer. There was provided insoluble polyvinyl pyrrolidone in a yield of 95% of theory.

EXAMPLE 4

To a small citrate type glass pressure flask were charged 36 grams of N-vinyl pyrrolidone, 0.36 gram of sodium borohydride flakes and 11 milliliters of water. A magnetic agitator was inserted, the flask was purged with nitrogen and sealed. The flask was heated in an oil bath while the contents were stirred magnetically. A temperature of 135° C. was maintained for two and a quarter hours, after which the oil bath was allowed to cool. When the temperature of the oil bath reached 85° C., there was a rise of 4° C. At the same time, the agitator was stopped due to the solidification of the mixture. The mixture did not polymerize until next day after remaining at room temperature for fourteen hours. There was provided insoluble polyvinyl pyrrolidone in a yield of 96% of theory.

EXAMPLE 5

To a 500 gallon kettle were charged 500 pounds of N-vinyl pyrrolidone, 5 pounds of sodium hydride and 75 pounds of water. The mixture was heated and maintained at 140° C. for two hours. It was then cooled over a one-hour period to 100° C. and maintained at that temperature. After one-half hour at 100° C. the temperature rose to 125° C. The mixture was treated as in Examples 1 and 2. There was provided insoluble polyvinyl pyrrolidone in a yield of 96% of theory.

EXAMPLE 6

To an autoclave were charged 360 grams of N-vinyl pyrrolidone, 5 grams of potassium borohydride and 51.5 milliliters of distilled water. The charge was heated and maintained at 140° C. for one hour, allowed to cool then maintained at 100° C. After one-half hour at 100° C. a temperature rise of 8° C. was noted. The mixture was then treated as in Example 1. There was provided insoluble polyvinyl pyrrolidone in a yield of 95% of theory.

What is claimed is:

1. An improved method for the polymerization of N-vinyl lactams to produce insoluble polymers thereof which comprises heating a mixture comprising an N-vinyl lactam corresponding to the formula:

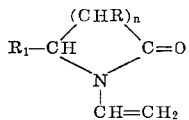

wherein each R independently represents a member selected from the group consisting of hydrogen, methyl and ethyl and $R_1$ represents a member of the group consisting of hydrogen and alkyl groups containing from 1 to 4 carbon atoms and $n$ represents a whole positive integer of from 2 through 4 in the presence of from about .05 to about 10 weight percent based upon monomer of a catalyst selected from the group consisting of hydrides and borohydrides of alkali metals and water in an amount of from about 1.0 to about 70 weight percent based on the weight of N-vinyl lactam at a first elevated temperature of from about 125° C. to about 200° C. for a period of time sufficent to induce incipient polymerization and forthwith cooling said mixture to a second temperature of from about 75° C. to about 100° C. and maintaining said mixture at said second temperature until polymerization is complete.

2. The method according to claim 1 wherein the N-vinyl lactam is N-vinyl caprolactam.

3. An improved method for the polymerization of N-vinyl lactams to produce insoluble polymers thereof which comprises heating a mixture comprising an N-vinyl lactam corresponding to the formula:

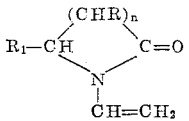

wherein each R independently represents a member selected from the group consisting of hydrogen, methyl and ethyl and $R_1$ represents a member of the group consisting of hydrogen and alkyl groups containing from 1 to 4 carbon atoms and $n$ represents a whole positive integer of from 2 through 4 in the presence of about 1 weight percent based on monomer of a catalyst selected from the group consisting of hyrdides and borohydrides of alkali metals and water in an amount of from about 5 to 40 weight percent based on the weight of N-vinyl lactam at a first elevated temperature of from about 125° C. to about 200° C. for a period of time sufficient to induce incipient polymerization and forthwith cooling said mixture to a second temperature of from about 75° C. to about 100° C. and maintaining said mixture at said second temperature until polymerization is complete.

4. The method according to claim 3 wherein the N-vinyl lactam is N-vinyl pyrrolidone.

5. The method according to claim 3 wherein the N-vinyl lactam is N-vinyl caprolactam.

6. The method according to claim 3 wherein the catalyst is sodium borohydride.

7. The method according to claim 3 wherein the catalyst is potassium borohydride.

8. The method according to claim 3 wherein the catalyst is sodium hydride.

9. The method according to claim 3 wherein the N-vinyl lactam is N-vinyl pyrrolidone and the catalyst is sodium borohydride.

10. The method according to claim 3 wherein the N-vinyl lactam is N-vinyl pyrrolidone and the catalyst is potassium borohydride.

11. The method according ot claim 3 wherein the N-vinyl lactam is N-vinyl pyrrolidone and the catalyst is sodium hydride.

12. The method according to claim 3 wherein the N-vinyl lactam is N-vinyl caprolactam and the catalyst is sodium borohydride.

No references cited.

JOSEPH L. SCHOFER, *Primary Examiner.*

H. WONG, *Assistant Examiner.*